United States Patent
Leuchtmann et al.

Patent Number: 5,741,046
Date of Patent: Apr. 21, 1998

[54] MOTOR VEHICLE REAR SEAT WITH A DIVIDED BACK REST

[75] Inventors: Andrew Leuchtmann, Bad Kreuznach; Hans-Peter Gimbel, Trebur, both of Germany

[73] Assignee: General Motors Corporation, Detroit, Mich.

[21] Appl. No.: 370,279

[22] Filed: Jan. 9, 1995

[30] Foreign Application Priority Data

Feb. 24, 1994 [DE] Germany .................. 44 05 959.0

[51] Int. Cl.⁶ ..................................................... B60N 2/02
[52] U.S. Cl. ............... 297/378.13; 297/257; 297/378.1; 296/65.1; 296/66
[58] Field of Search .................. 297/378.13, 233, 297/240, 248, 257, 378.12, 378.1; 296/65.1, 63, 66, 69

[56] References Cited

U.S. PATENT DOCUMENTS

| | | | |
|---|---|---|---|
| 3,408,103 | 10/1968 | Hewitt | 297/378.13 X |
| 3,516,704 | 6/1970 | Riester | 297/378.13 X |
| 3,788,685 | 1/1974 | Leichtl | 296/65 A |
| 4,475,763 | 10/1984 | Hamatani et al. | 296/65 R |
| 4,708,385 | 11/1987 | Kondo | 296/65 R |
| 4,721,338 | 1/1988 | Kondo | 296/379 |
| 4,869,541 | 9/1989 | Wainwright | 297/378.13 X |
| 5,273,336 | 12/1993 | Schubring et al. | 296/65.1 |

FOREIGN PATENT DOCUMENTS

| | | |
|---|---|---|
| 0 125 978 | 11/1984 | European Pat. Off. . |
| 0336819 A1 | 10/1989 | European Pat. Off. . |
| 0516593 A1 | 12/1992 | European Pat. Off. . |
| 2 532 595 | 3/1984 | France . |
| 2663889 | 1/1992 | France . |
| 32 11 363 | 10/1983 | Germany . |
| 3316024 C2 | 9/1986 | Germany . |
| 916746 | 1/1963 | United Kingdom . |
| 2247616 | 3/1992 | United Kingdom . |

OTHER PUBLICATIONS

Abstracts from Derwent Publication "Vehicle Trim & Hardware" 95–293738/39 and 95–293739/39, Schmidt GmbH.

*Primary Examiner*—Laurie K. Cranmer
*Attorney, Agent, or Firm*—Ernest E. Helms

[57] ABSTRACT

In a motor vehicle rear seat with a divided back rest, the individual back rest parts are connected for pivoting about at least one horizontal pivot axis running horizontally and transversely to the travel direction via an inner hinge arranged in the region of the division plane of the back rest and an outer hinge in the region of the side wall of the motor vehicle on the vehicle body, each hinge having a fastening part on the back rest side and a fastening part on the vehicle body side. To increase the safety of the passengers in the event of a frontal or rear-end collision, the fastening parts are arranged on the outer hinge by means of a hinge joint arranged in a stationary manner on the vehicle body and the fastening parts on the inner hinge at a distance behind the pivot axis relative to the direction of travel and connected with one another by means of a retractable mechanism so that the fastening part on the back rest side upon the pivoting of the back rest part moves in a circular path about the pivot axis.

7 Claims, 5 Drawing Sheets

MOTOR VEHICLE REAR SEAT WITH A DIVIDED BACK REST

FIELD OF THE INVENTION

The invention relates to a motor vehicle rear seat with a divided back rest whose individual back rest parts are hinged for pivoting about at least one pivot axis running horizontally and transversely to the direction of travel by an inner hinge in the region of the division plane on the back rest and an outer hinge in the region of the side wall of the motor vehicle, with each hinge having a fastening part on the back rest side and on the vehicle body side.

BACKGROUND OF THE INVENTION

Such vehicle rear seats are used especially in passenger cars and multipurpose vehicles which have a cargo space behind the back rest which can be enlarged by folding down the back rest or its individual components. In such cases, it is advantageous for the back rest to have a pivot axis arranged as far forward as possible relative to the direction of travel. Such an arrangement of the pivot axis is simple to realize in the case of vehicle rear seats with a continuous back rest since the outer hinges determining the position of the pivot axis are arranged outside of the seating area in the region of the side wall.

However, in the case of a divided back rest, it has been found to be problematic to move the pivot axis of the back rest forward because the inner hinges for folding the individual back rest parts must be arranged in the division plane in the region of the cushion support.

SUMMARY OF THE INVENTION

The purpose of the invention is to devise a vehicle rear seat in which the cushion support is far to the front, relative to the direction of travel.

This problem is solved by the fact that the fastening parts on the outer hinge are arranged by means of a hinge joint mounted in a stationary manner on the vehicle body and the fastening parts of the inner hinge are arranged at a distance behind the pivot axis, relative to the direction of travel, and are connected to one another by a retractable mechanism so that the fastening part of the back rest side moves over a circular path around the pivot axis when the back rest part is pivoted.

As a result of this design, it is possible to move the pivot axis of the back rest or back rest parts relatively far to the front into the region of the cushion support of the seat cushion or back rest, in which case the position of this pivot axis is determined by the two outer stationary hinges arranged outside of the seating area on the sidewall. The stationary arrangement of the hinges in this case means that the position of the pivot axis is determined only by the fastening part on the vehicle body side, and the fastening part on the back rest side can rotate only about this pivot axis.

Since the inner hinges are arranged at a distance behind the pivot axis, space is present between the hinges and the cushion support. Furthermore, this design of the inner hinges makes it possible to give the seating area an optional configuration.

The inner hinges can be arranged in a simple manner at a distance behind the pivot axis of the back rest part if the retractable mechanism is designed as a scissors-like multiple joint mechanism in which the scissors part consists of two equal-length lever parts which are connected to one another by a hinge joint arranged in the center. A conventional rivet or pin joint may be used as the hinge joint.

For a rotatable connection with the fastening part on the vehicle body side, the scissors part on the side facing the fastening part at both ends of the lever parts in each case displays a hinge joint, of which one hinge joint is provided for connection with the fastening part and the other hinge joint for connection with an end of a rotating arm or lever where the rotating lever with its other end is connected also to the fastening part via another hinge joint.

For a rotatable connection with the fastening part on the back rest side, the scissors part on the side facing the fastening part on the back rest side at each end of the lever parts displays a hinge joint, of which one hinge joint is provided for connection with the fastening part and the other hinge joint for connection with an end of an intermediate lever where the intermediate lever is connected with its other end to the fastening part via another hinge joint.

According to the invention, it is envisioned that the distances between two hinge joints on two fastening parts, on the lever parts, on the rotating lever and on the intermediate lever are the same. In addition, it is advantageously provided that the axes of at least two hinge joints on the vehicle body side (the axis of the lever part and the rotating lever) of the retractable mechanism and the pivot axis lie in the same plane, the axis of the hinge joint of the lever part being arranged in the center between the pivot axis and the axis of the hinge joint of the rotating lever.

Through this design of the inner hinge, the fastening part on the back rest side during the rotational movement can describe an approximately circular path about the pivot axis and thereby make smooth pivoting of the back rest part possible.

Each inner hinge, relative to the mobility of the two fastening parts to one another, can be locked by means of a locking device. This locking device is capable of being locked and unlocked jointly with a locking device engaging the side wall of the motor vehicle. The locking device engaging the side wall of the motor vehicle may be a conventional locking mechanism which, when the back rest part is locked, for example, collaborates with a locking bolt mounted on the side wall of the vehicle.

Due to the joint locking to the side wall and on the inner hinge, the stability of the back rest part is increased in each case regardless of the usage position of the other back rest part. At the same time, the locking on the inner hinge means that when them is a load on the back rest part due to an accident, a moment of resistance arises about the pivot axis of the back rest part which is directed against the forces acting on the back rest part.

For the joint locking and unlocking, according to the invention it is provided that between the two locking devices of a back rest part, an active connection exists wherein in the event of locking or unlocking of a locking device (e.g., of the locking device engaging the side wall), the locking or unlocking of the other locking device (e.g., on the inner hinge) is triggered. The active connection may be mechanical, e.g. a rod, or electrical. In the latter case, one or even both locking devices may be equipped with devices for electrical activation such as electrical control elements so that in the event of locking or unlocking, only one triggering signal need be transmitted from one locking device to the other.

The two locking devices may be activated jointly in an especially simple way if the active connection is designed as a cable pull which is affixed on the one hand on a spring-loaded lock bolt of the locking mechanism of the locking device engaging the side wall, and on the other hand on a movably mounted locking lever of the locking device on the inner hinge in a releasable manner. For this purpose, conventional holders for a releasable connection with the corresponding cable ends are provided on the lock bolt and on the locking lever. Due to its flexibility, the cable, which may also be designed as a Bowden cable, is especially well suited for being laid and affixed in the hollow spaces of the back rest part or the vehicle body.

When the back rest part is pivoted back into the approximately vertical position of use, the locking mechanism locks automatically and thus anchors the back rest part to the side wall. In this case, the movement of the lock bolt which is under the tension of a spring arranged on the lock mechanism out of a snap-released position into the locking position is transmitted via the cable to the locking lever of the locking device on the inner hinge so that the inner hinge is also locked.

The inner hinge, as usual, has two fastening parts, one on the back rest side and one on the vehicle body side. According to the invention, the fastening part on the vehicle body side is provided with a lug which in the approximately vertical position of use of thee back rest part fits into an opening on the fastening part on the back rest side. Since the locking lever is advantageously designed as a two-armed pivoting lever with a hinge joint arranged between the two arms, one of the two pivot arms upon activation can engage the lug and in this way hold the fastening part on the back rest side to the fastening part on the vehicle body side. In this way, the back rest part can no longer rotate about the pivot axis.

The unlocking of the two locking devices is accomplished in an especially simple manner by activation of a release button arranged on the back rest part. This moves the lock bolt against the force of the spring until it finally snaps into the release position. As in the case of the locking process, the movement of the lock bolt by the cable pull is transmitted to the locking lever on the inner hinge and thus causes it to open.

The locking lever, the lock bolt and the active connection between the two locking devices according to the invention are arranged on the back rest part. This design is especially advantageous because the back rest part together with all of the components belonging to it necessary for the locking and unlocking process can be preassembled and installed as a unit in the vehicle. The back rest part can also be installed in the vehicle fully assembled.

According to another version not shown in the drawings, the locking lever, the lock bolt and the active connection are arranged on the vehicle body. This arrangement is especially well suited for vehicles in which the locking mechanism for the back rest, for engineering or other reasons, is arranged in the side wall of the vehicle body and the corresponding locking bolts collaborating with the locking mechanism are arranged on the back rest part. In this version, all components necessary for the locking and unlocking process such as the cable pull or pins for locking the inner hinge can be laid or assembled in the vehicle body. As a result, the back rest part is relieved of weight, and more free space is available for the shaping of the back rest part.

The invention permits numerous variants. For further illustration of its basic principle, one of them is shown in the accompanying drawings and described below.

DESCRIPTION OF THE PREFERRED EMBODIMENT

Figure 1:
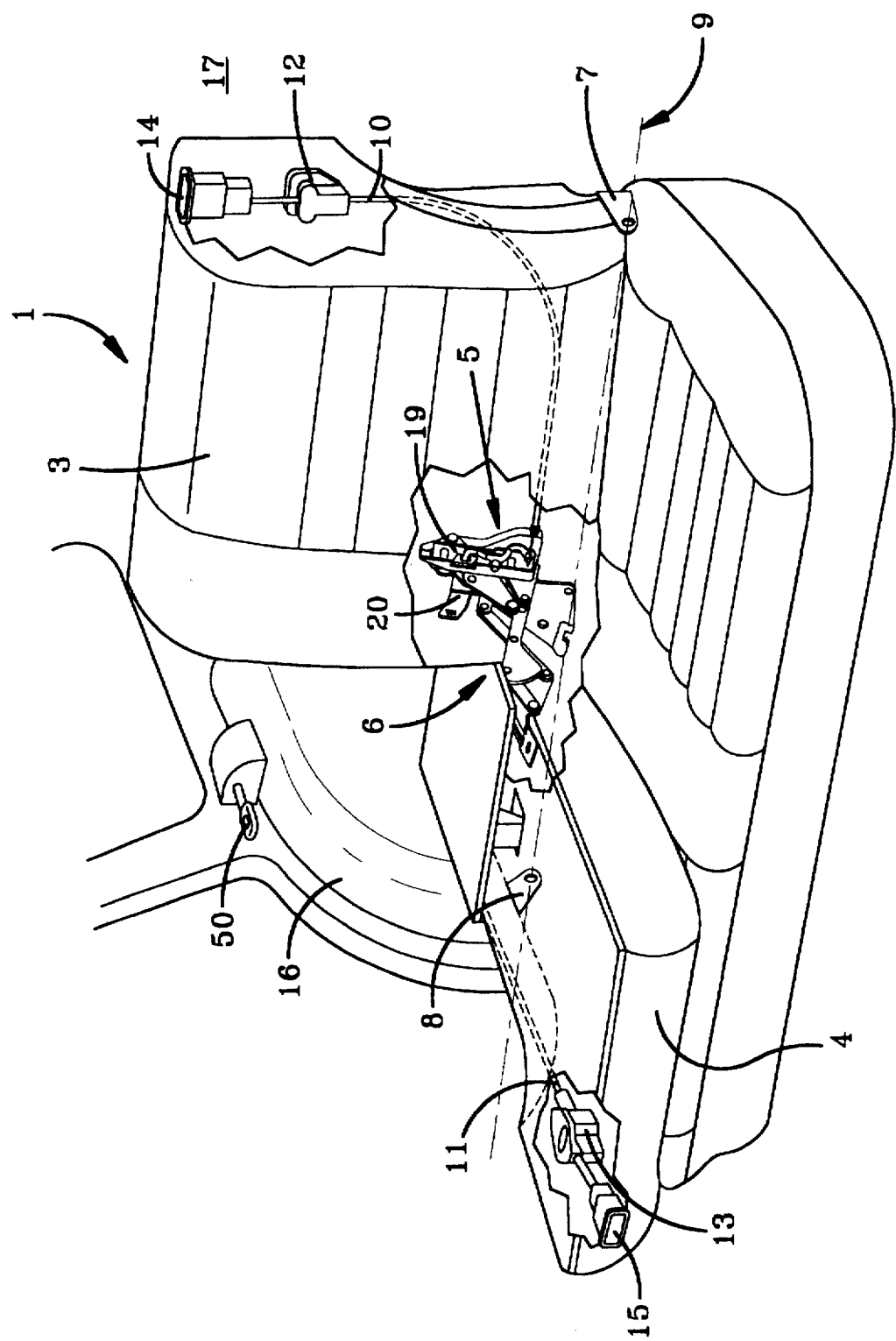
FIG. 1 is perspective view of a vehicle rear seat arrangement according to the invention with a divided back rest where the back rest part is folded forward.

In the case of the vehicle folding rear seat arrangement 1 shown in FIG. 1, the seat back or back rest is divided off-center, the individual back rest pans 3 and 4 rotating about a first pivot axis 9 when folded. For this purpose, each back rest pan 3 or 4 has an out bound or outer hinge 7 or 8 arranged in the region of the side wall 16 or 17 and an in board or inner hinge 5 or 6 arranged in the region of the division plane of the back rest. The hinges 5, 6, 7, 8 are designed and arranged on the vehicle body 2 in such a way that the pivot axis 9 runs as a continuous line horizontally and transversely to the direction of travel of the vehicle the seat is located in. In FIG. 1, the back rest part 4 is unlocked and folded and the back rest part 3 is locked in the approximately vertical position of use, while the pans integrated in the back rest pan 3, 4 or arranged behind the back rest part 3, 4 are shown in visible form in order to illustrate the invention.

To lock the back rest part 3 in the region of the side wall 17 (not shown), a locking device 12 is provided which is connected by a cable pull 10 to another locking device 19 on the inner hinge 5. In this way, both locking devices 12, 19 can be jointly locked or unlocked, the locking occurring automatically due to the pivoting of the back rest part 3 back into the approximately vertical position of use and the unlocking taking place by activation of a release button 14 arranged on the top of the back rest part 3.

The locking or unlocking of the back rest part 4 is accomplished in a similar manner to that for the back rest part 3. For illustration of automatic locking, a locking strap 50 connected firmly to the vehicle body 2 in the region of the side wall 16 is shown which upon the pivoting back of the back rest part 4 collaborates with the locking device 13.

Figure 2:
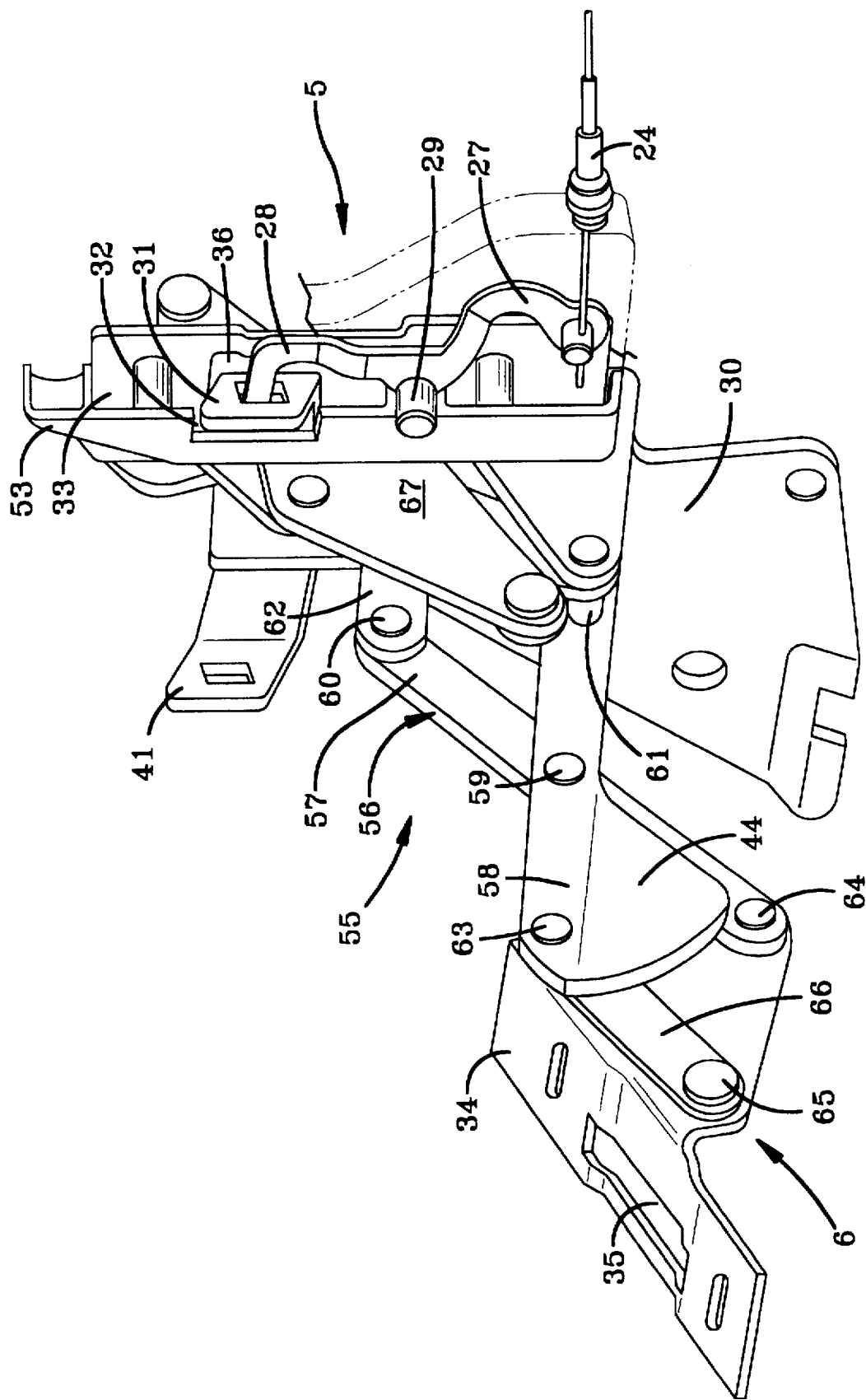
FIG. 2 shows an inner hinge according to the invention as shown in FIG. 1 in perspective view where one hinge is in the locked position and the other hinge is shown in a position corresponding to a folded back rest part.

FIG. 2 shows in a perspective view the inner hinges 5, 6 of FIG. 1 according to the invention without the surrounding parts, where one hinge 5 is in the locked position and the other hinge 6 is in a position corresponding to the folded back rest 4. Since all details of the inner hinges 5, 6 are mirror images relative to the division plane of the back rest, in the following only one inner hinge 5 or 6 will be described.

Thus, the inner hinge 6 essentially has a fastening part 30 fixed on the vehicle body side, a fastening part 34 fixed on the back rest side and a retractable mechanism 55, the fastening part 30 on the vehicle body side being designed such that it simultaneously may be used as the fastening part on the vehicle body side for the inner hinge 5. The retractable mechanism 55 connecting the two fastening parts 30, 34 is designed as a scissors-like multiple joint mechanism in which the scissors part 56 consists of two equal-length first and second links or lever parts 58, 57 which are connected with one another by a center or hinge joint 59. The lever part 58 has a flat seat 44 which in this position of the scissors part 56 for safety reasons covers an opening (not shown) between the fastening part 34 and the lever parts 57,58.

For the rotatable connection with the fastening part 30 on the vehicle body side, the scissors part 56 on the side facing the fastening part 30 at both ends of the lever parts 57, 58 has a hinge joint 60, 61. One hinge joint 61 is provided for a direct connection with the fastening part and the other hinge joint 60 for connection with an end of a second intermediate link or rotating lever 62 where the rotating lever 62 is connected with its other end through another hinge joint 71 also to the fastening part 30.

For the rotary connection with the back rest side fastening part 34, the scissors part 56 on the side facing the fastening part 34 on the back rest side at both ends of the lever parts 57, 58 has in each case a hinge joint 63, 64 of which one hinge joint 64 serves to connect it with the fastening part 34 on the back rest and the other hinge joint 63 serves to connect it with an end of a first intermediate link or intermediate lever 66, the intermediate lever 66 with its other end being connected by another hinge joint 65 also to the fastening part 34 on the back rest side.

To lock the inner hinge 6, a lug 41 is provided on the fastening part 30 on the vehicle body side which, when the back rest part 4 is pivoted back into the approximately vertical position of use, passes into an opening 35 on the fastening part 34 of the back rest side. As exemplified by the locked hinge 5, one clearly sees that in this position of the pivot arm 28 the locking lever 26 engages an opening 36 in the lug 31 and thus locks the inner hinge 5. The inner hinge 6 is locked in a similar manner.

Figure 4:
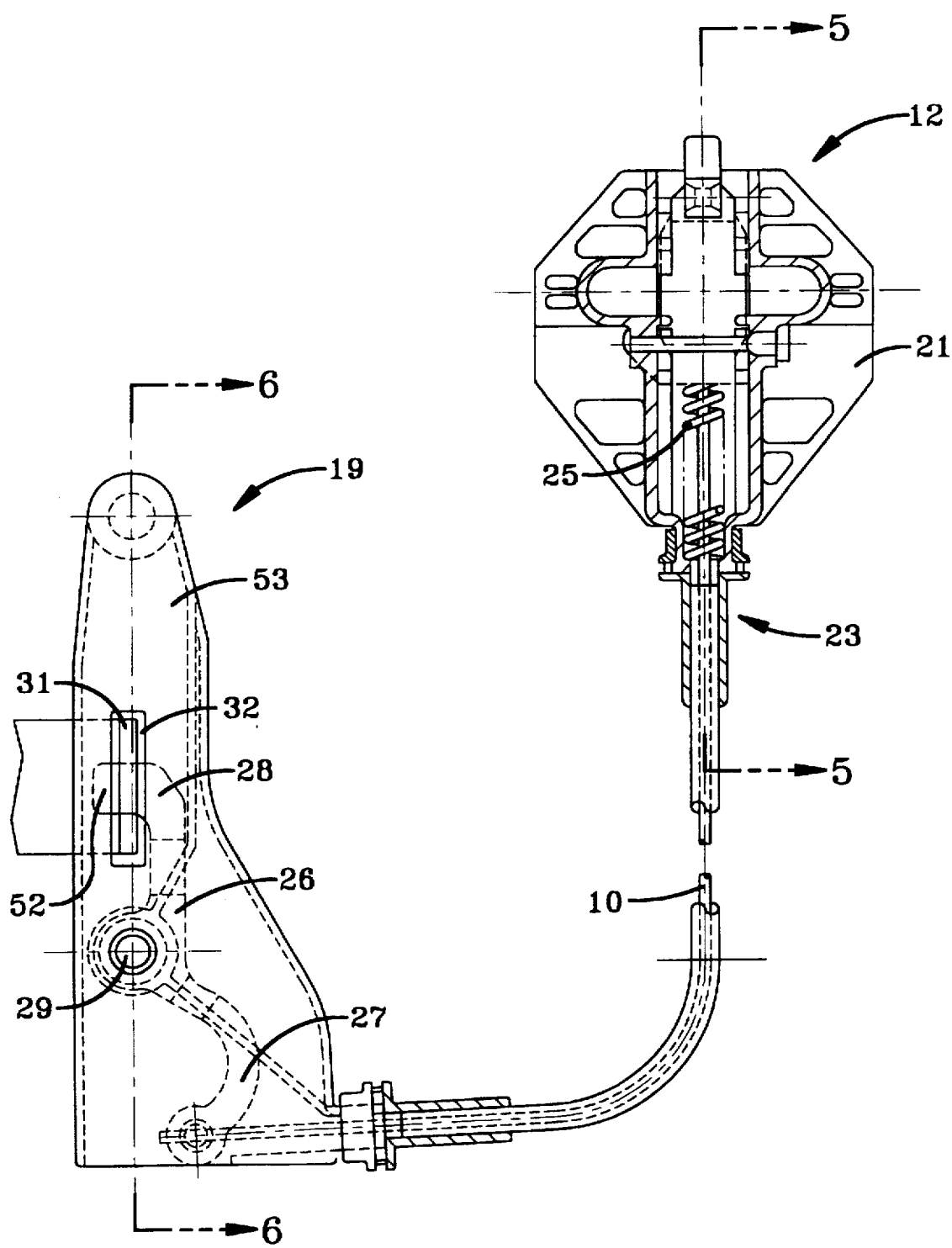
FIG. 4 partial schematic view of locking devices as in FIG. 1 which are connected with one another by a cable pull.

As also shown in FIG. 2, the locking lever 26 is pivot mounted on the fastening part 33 on the back rest side by means of the hinge joint 29. The pivot arm 27 of the locking lever 26 in this case is connected in a releasable manner to the end 24 of the cable bolt 10. When locked, this pivot arm 27 is activated by means of this cable pull 10. The cable pull 10 can be a force transmitting member that when activated will push the lower end of the pivot arm 27 clockwise (as shown in FIG. 4) or the cable pull 10 can be relaxed to a point that the moment forces acting on the pivot arm 27 and locking arm 26 (about the hinge joint 29) will cause them to rotate clockwise to release the pivot arm 26 from the angle bend 52.

For further simplification of the design of the hinges 5, 6 according to the invention, the hinge joints arranged on the fastening part on the vehicle body side can be designed as hinge joints acting simultaneously for both retractable mechanisms 55, 67. This concerns especially the rotary mounting of the lever part 58 and the rotary lever 62 on the hinges 5, 6 on the vehicle body side.

Figure 3:
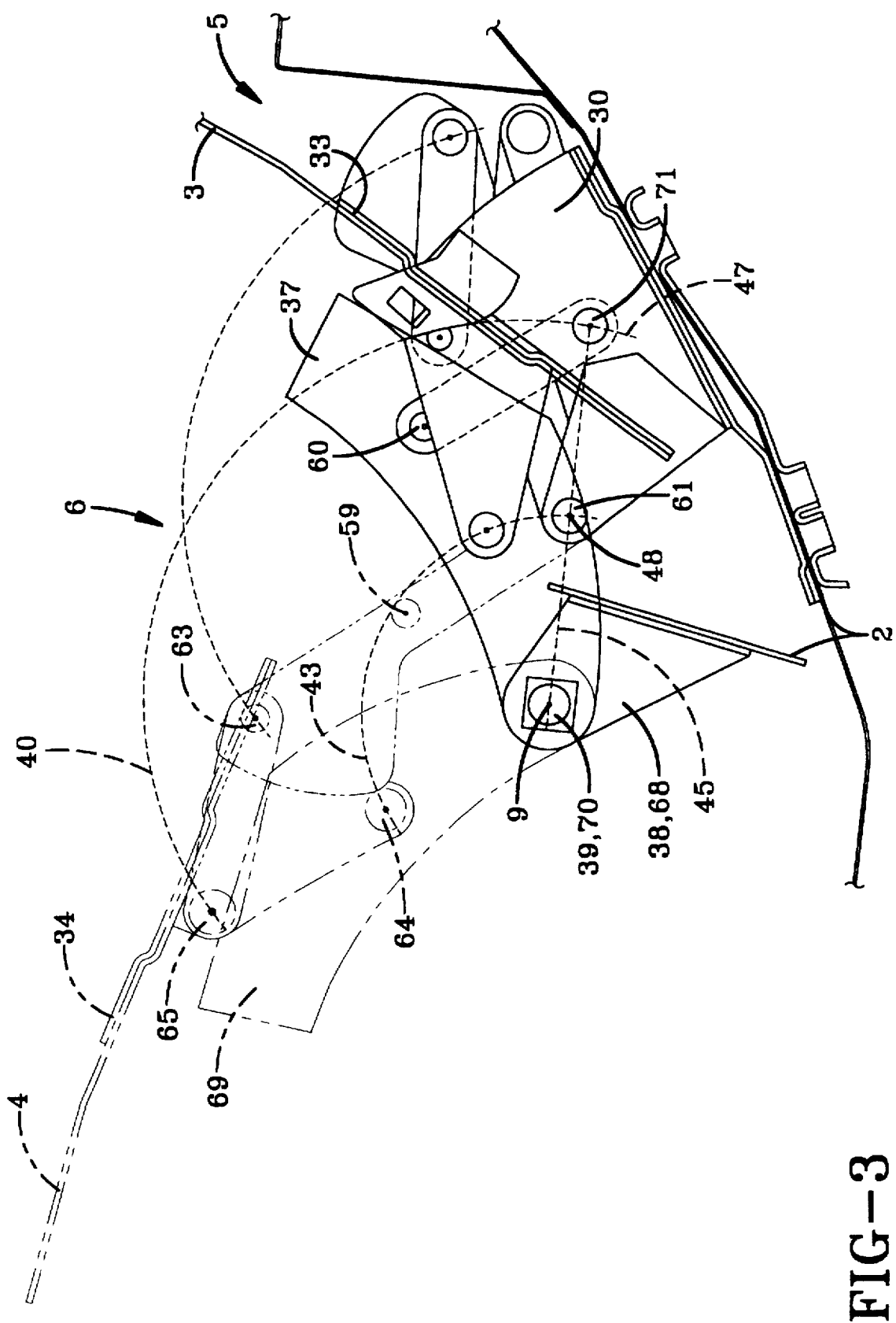
FIG. 3 is a side view of the inner and outer hinges in FIG. 1 where the hinges are indicated transparently and by thin lines for the purpose of illustration.

FIG. 3 shows a side view of the inner hinges 5, 6 and the outer hinges 7, 8 according to FIG. 1 but without locking devices 19, 20 where the inner hinge 6 and the outer hinge 8 of the back rest pan 4 are shown by thin lines. The outer hinge 8 has a fastening part 68 on the vehicle body side and a fastening part 69 on the back rest side which are connected with one another by a hinge joint 70. The outer hinge 7 of the back rest part 3 consists of a fastening part 38 on the vehicle body side and a fastening part 37 on the back rest side which are connected with one another by a hinge joint 39. The fastening parts 30, 38, 68 on the vehicle body side are correspondingly firmly connected to the vehicle body 2, and the fastening pans 33, 34, 37, 69 on the back rest side are correspondingly connected to a supporting structure of the back rest part 3, 4.

In FIG. 3 one also sees that the axes 47, 48 of the hinge joints 61, 71 on the vehicle body side of the retractable mechanism 55 and the pivot axis 9 lie in the same plane 45 where the axis 62 is arranged in the center between the pivot axis 9 and the axis 47. In this case the distance between the pivot axis 9 and the axis 48 or this axis 48 and the axis 47 of the hinge joint 71 corresponds to the distances in each case between two hinge joints on the two fastening pans 30, 34, on the lever part 57, 58, on the rotary lever 62 and the intermediate lever 66.

This design contributes significantly to the fact that the fastening parts 34 on the back rest side and therefore also the back rest part 4 move in a circular path 40, 43 about the pivot axis 9 when pivoted.

The kinematic relationships in the case of joint activation of the locking devices 12 and 19 or 13 and 20 are shown in FIG. 4. Since the kinematic relationships for the locking devices 12, 19 and 13, 20 of the two back rest parts 3, 4 are the same, in the following only the kinematic relationships exemplified by the locked back rest part 3 shown in FIG. 1 are explained.

Figure 5:
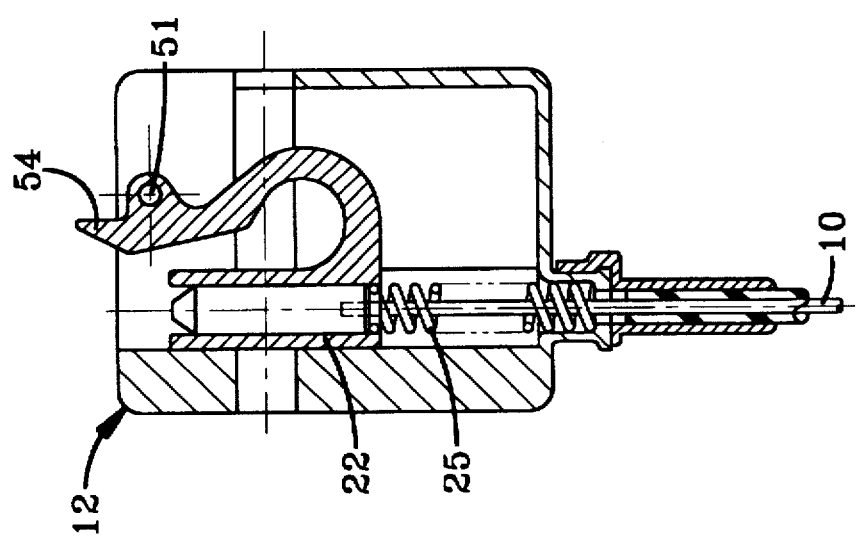
FIG. 5 is a sectional representation of the locking device along section line I in FIG. 4.

As FIG. 4 shows, the locking device 12 engaging the side wall 17 has a locking mechanism 21 in which a lock bolt 22 can be guided so as to latch, while a spring 25 arranged on the locking mechanism 21 exerts tension in the locking position 2 shown. As FIG. 5 especially shows, the lock bolt 22 has a spring-loaded latching leg 54 directed toward the top 2 which is provided with a boring 51 for connecting it with a release button 14 (not shown). The locking device 12, depending on the version of the invention, can be arranged on the back rest part 3 or on the vehicle body 2.

Figure 6:
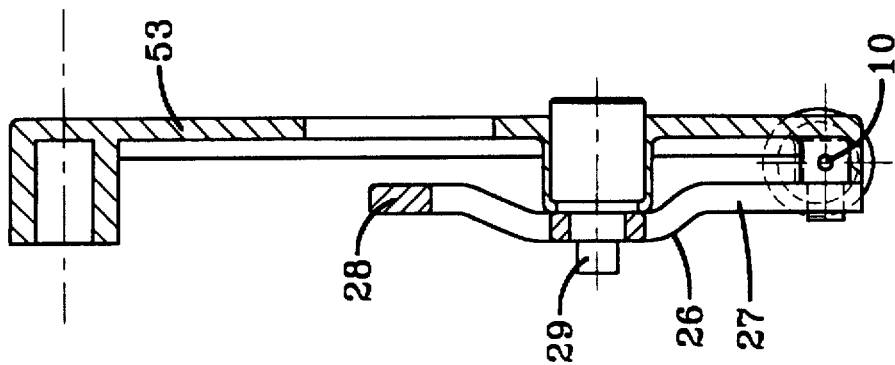
FIG. 6 is a sectional view of the locking device along section line II in FIG. 4.

To connect the two locking devices 12 and 19, a cable pull 10 is provided. The cable pull 10 is connected in a releasable manner at one end 23 with the lock bolt 22 and at the other end 24 to a pivot arm 27 of a locking lever 26. The other pivot arm 28 is provided with an angle bend 52 which engages a lug 31 in the locked state. The lug 31 in this case is indicated by a thin broken dotted line for better understanding. The locking lever 26 as FIG. 6 illustrates is pivot mounted by a hinge joint 29 on a holder 53 which, depending on the version of the invention, may be arranged on the inner hinge, on the back rest part 3 or on the vehicle body 2.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of a folding rear seat in a body of a motor vehicle, the rear seat having a back split along a plane into a first seat back and a second seat back, the first and second seat backs having a first pivotal axis with the vehicle body, the first pivotal axis being horizontal and transverse to a direction of travel of the motor vehicle, the arrangement comprising:

first and second outboard hinges, each outboard hinge having a fastener member fixably connected to the motor vehicle body and a second member fixably connected to a respective seat back, the first and second outboard hinge fastener member and second member being pivotally connected along the pivotal axis;

at least a first inboard hinge located adjacent the split plane of the motor vehicle seat back, the inboard hinge including a fastener member fixed with the vehicle body at a location rearward of the outboard hinge fastener members;

a retraction mechanism for the first seat back and the second seat back, each retraction mechanism having at least a first and second generally equal scissors length links pivotally joined to one another approximately at their centers, the first scissors link being pivotally connected to the inboard hinge fastener member at one end, and the first scissors link being pivotally joined to a first intermediate link at the opposite end, the first intermediate link also being pivotally connected to the respective seat back, and the second scissors link being pivotally connected to the respective seat back at one end and pivotally connected to a second intermediate link at an opposite end, the second intermediate link being pivotally connected with the inboard hinge fastener member, and wherein the respective seat back describes a circular path around the first pivotal axis when the seat back is folded forward.

2. An arrangement of a folding rear seat as described in claim 1, wherein the inboard hinge of the first and second seat backs share a common fastener member.

3. An arrangement of a folding rear seat as described in claim 1, wherein the first and second intermediate links are of equal length.

4. An arrangement of a folding rear seat as described in claim 1, wherein the first pivotal axis is forward of the pivotal connection of the second intermediate link with the inboard hinge fastener member a distance equal to the distance of the pivotal connection of the first scissors link with the inboard hinge fastener member to the pivotal connection of the first scissors link with the first intermediate link.

5. An arrangement of a folding rear seat as described in claim 1 having a first latching lock connected on the seat back to latch with a sidewall of the motor vehicle, the first locking device including a locking bolt relatively mounted with the seat back for interconnection with a locking strap on the motor vehicle sidewall.

6. An arrangement of a folding rear seat as described in claim 5 further having a second locking device including a pivotal lever mounted on the seat back which can pass into a slot fixed with respect to the inboard fastener member, the pivotal lever preventing one of the respective seat back retraction mechanism from being folded forwardly, and wherein the first and second locking devices are operatively released with a common cable operatively associated with a common release button.

7. An arrangement of a folding rear seat back as described in claim 1 further having a second locking device including a pivotal lever mounted on the seat back which can pass into a slot fixed with respect to the inboard hinge fastener member, the pivotal lever preventing one of the respective seat back retraction mechanism from being folded forwardly.

* * * * *